(12) United States Patent
Sheridan

(10) Patent No.: US 10,787,930 B2
(45) Date of Patent: Sep. 29, 2020

(54) WINDMILL LUBRICATION GEAR TRAIN FOR LUBRICANT SYSTEM IN A GEARED GAS TURBINE ENGINE

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 197 days.

(21) Appl. No.: 15/934,616

(22) Filed: Mar. 23, 2018

(65) Prior Publication Data
US 2019/0292943 A1   Sep. 26, 2019

(51) Int. Cl.
*F02C 7/06* (2006.01)
*F02C 7/36* (2006.01)
(Continued)

(52) U.S. Cl.
CPC ............. *F01D 25/20* (2013.01); *F01D 15/12* (2013.01); *F02C 7/06* (2013.01); *F02C 7/32* (2013.01);
(Continued)

(58) Field of Classification Search
CPC ...... F01D 25/12; F01D 25/20; F16H 57/0479; F16H 57/0442; F16H 57/0436;
(Continued)

(56) References Cited

U.S. PATENT DOCUMENTS

| | | |
|---|---|---|
| 4,478,082 A | 10/1984 | Sato et al. |
| 5,315,821 A | 5/1994 | Dunbar et al. |

(Continued)

FOREIGN PATENT DOCUMENTS

| | | |
|---|---|---|
| EP | 3159500 A1 | 4/2017 |
| EP | 3258086 A1 | 12/2017 |

(Continued)

OTHER PUBLICATIONS

European Search Report for EP Application No. 19164992.0 dated Jul. 16, 2019.

(Continued)

*Primary Examiner* — William H Rodriguez
(74) *Attorney, Agent, or Firm* — Carlson, Gaskey & Olds, P.C.

(57) ABSTRACT

A gas turbine engine includes a fan driven by a fan drive turbine through a gear reduction. An oil pump is driven by a main input gear, and the main input drive gear rotates when the fan rotor rotates. A gear train is intermediate the main input gear and the oil pump. The gear train includes a forward input gear and a reverse input gear, each driven by the main input gear. The forward input gear drives a forward pinion gear through a first clutch and the reverse input gear drives a reverse pinion gear through a reverse clutch. The forward clutch transmits rotation from the forward input gear to the forward pinion gear when the fan is rotating in a first direction, and not transmitting rotation from the forward input gear to the forward pinion gear when the fan is rotating in a second opposed direction. The reverse clutch transmits rotation from the reverse input gear to the reverse pinion gear when the fan is rotating in the second opposed direction, and not transmitting rotation from the reverse input gear to the reverse pinion gear when the fan is rotating in the first direction. One of the forward and reverse pinion gears drive a pump drive gear, to, in turn, drive the pump.

14 Claims, 4 Drawing Sheets

(51) Int. Cl.
   *F01D 25/20*    (2006.01)
   *F01D 15/12*    (2006.01)
   *F02C 7/32*     (2006.01)
   *F02K 3/06*     (2006.01)
   *F16H 57/04*    (2010.01)

(52) U.S. Cl.
   CPC .............. *F02C 7/36* (2013.01); *F02K 3/06* (2013.01); *F16H 57/0436* (2013.01); *F16H 57/0442* (2013.01); *F16H 57/0479* (2013.01); *F05D 2220/323* (2013.01); *F05D 2260/4031* (2013.01); *F05D 2260/40311* (2013.01); *F05D 2260/98* (2013.01)

(58) Field of Classification Search
   CPC ...... F02K 3/06; F02C 7/06; F02C 7/32; F02C 7/36; F05D 2260/98; F05D 2260/4031; F05D 2260/40311; F05D 2220/323
   See application file for complete search history.

(56) References Cited

U.S. PATENT DOCUMENTS

| | | |
|---|---|---|
| 5,836,746 A | 11/1998 | Maruyama et al. |
| 6,290,024 B1 | 9/2001 | Ehlert |
| 6,481,978 B2 | 11/2002 | Zamalis et al. |
| 7,662,059 B2 | 2/2010 | McCune |
| 7,883,438 B2 | 2/2011 | McCune |
| 8,215,454 B2 | 7/2012 | Portlock et al. |
| 8,230,974 B2 | 7/2012 | Parain |
| 8,702,373 B1 | 4/2014 | Valva et al. |
| 8,978,829 B2 | 3/2015 | McCune et al. |
| 9,840,969 B2 | 12/2017 | Sheridan |
| 10,145,276 B2 | 12/2018 | Parnin |
| 10,196,926 B2 | 2/2019 | Ketchum et al. |
| 10,267,233 B2 | 4/2019 | Mastro |
| 2006/0223664 A1 | 10/2006 | Duong et al. |
| 2010/0023169 A1 | 1/2010 | Delaloye |
| 2013/0098059 A1* | 4/2013 | Suciu ................ F02C 9/16 60/783 |
| 2013/0195603 A1 | 8/2013 | Sheridan et al. |
| 2015/0292359 A1 | 10/2015 | Ketchum et al. |
| 2015/0377066 A1 | 12/2015 | Duong et al. |
| 2016/0222975 A1 | 8/2016 | Sheridan et al. |
| 2016/0290229 A1 | 10/2016 | Sheridan et al. |
| 2016/0305284 A1* | 10/2016 | Mastro ................ F01D 25/20 |
| 2016/0376988 A1* | 12/2016 | Sheridan ............ F04D 29/325 60/39.08 |
| 2017/0002738 A1* | 1/2017 | Sheridan ............... F02C 7/06 |
| 2017/0009776 A1 | 1/2017 | Gomanne et al. |
| 2017/0114662 A1 | 4/2017 | Mastro |
| 2017/0122330 A1 | 5/2017 | Mastro et al. |
| 2017/0356452 A1 | 12/2017 | Mastro |
| 2018/0045119 A1* | 2/2018 | Sheridan ............. F02C 7/275 |
| 2018/0135741 A1* | 5/2018 | Xu .................... B64D 37/22 |
| 2018/0158261 A1 | 6/2018 | Ottikkutti et al. |
| 2018/0202368 A1* | 7/2018 | Suciu ................ F02C 7/275 |
| 2019/0323597 A1* | 10/2019 | Sheridan ............... F02C 7/06 |

FOREIGN PATENT DOCUMENTS

| | | |
|---|---|---|
| WO | 2015/060912 A2 | 7/2014 |
| WO | WO2015/147949 | * 10/2015 |

OTHER PUBLICATIONS

European Search Report for EP Application No. 19169100.5 dated Aug. 8, 2019.

* cited by examiner

WINDMILL LUBRICATION GEAR TRAIN FOR LUBRICANT SYSTEM IN A GEARED GAS TURBINE ENGINE

BACKGROUND

This application relates to the provision of a gear train for driving an oil pump to supply oil to a gear reduction in a gas turbine engine, wherein windmill rotation in either direction will cause the gear train to supply oil to the gear reduction.

Gas turbine engines are known and typically include a fan delivering air into a bypass duct as bypass air and into a core engine. Air in the core engine is delivered to a compressor where is it compressed and delivered into a combustor section. The compressed air is mixed with fuel and ignited and products of this combustion pass downstream over turbine rotors, driving them to rotate.

Historically, a turbine rotor was directly connected to drive the fan. However, recently it has been proposed to include a gear reduction between the turbine and the fan rotor.

The gear reduction requires adequate lubrication under all operational conditions. One challenge is that a fan rotor on a gas turbine engine can experience so-called "windmilling" operation. Windmilling can occur if the engine is otherwise shutdown while in flight and air is driven across the fan blades by the movement of the associated aircraft. This can cause the fan rotor to rotate. In addition, a high wind while the associated aircraft is on the ground can also cause windmilling.

Lubricant must be supplied to the gear reduction during this windmilling operation, and a challenge is that the windmill rotation of the fan rotor can occur in either direction.

While gear trains are known which supply rotation in either direction of windmill rotation, they require relatively large package space.

SUMMARY

In a featured embodiment, a gas turbine engine includes a fan driven by a fan drive turbine through a gear reduction. An oil pump is driven by a main input gear, and the main input drive gear rotates when the fan rotor rotates. A gear train is intermediate the main input gear and the oil pump. The gear train includes a forward input gear and a reverse input gear, each driven by the main input gear. The forward input gear drives a forward pinion gear through a first clutch and the reverse input gear drives a reverse pinion gear through a reverse clutch. The forward clutch transmits rotation from the forward input gear to the forward pinion gear when the fan is rotating in a first direction, and not transmitting rotation from the forward input gear to the forward pinion gear when the fan is rotating in a second opposed direction. The reverse clutch transmits rotation from the reverse input gear to the reverse pinion gear when the fan is rotating in the second opposed direction, and not transmitting rotation from the reverse input gear to the reverse pinion gear when the fan is rotating in the first direction. One of the forward and reverse pinion gears drive a pump drive gear, to, in turn, drive the pump.

In another embodiment according to the previous embodiment, the reverse pinion gear is driving the pump drive gear through a reverse idler gear.

In another embodiment according to any of the previous embodiments, the first and second clutches are sprag clutches.

In another embodiment according to any of the previous embodiments, an outer peripheral surface of the pump drive gear is within an envelope of an outer peripheral surface of the main input gear as defined in a plane perpendicular to an axis of rotation of the main input gear.

In another embodiment according to any of the previous embodiments, the outer peripheral surface of the pump drive gear is entirely intermediate an outer peripheral surface of the forward drive gear and an outer peripheral surface of the reverse drive gear.

In another embodiment according to any of the previous embodiments, the pump has an outer peripheral surface which is entirely intermediate the outer peripheral surfaces of the forward and reverse input gears.

In another embodiment according to any of the previous embodiments, an axis of rotation of the pump drive gear is intermediate axes of rotation of the reverse input gear and the forward input gear.

In another embodiment according to any of the previous embodiments, the outer peripheral surface of the pump drive gear is entirely intermediate an outer peripheral surface of the forward drive gear and an outer peripheral surface of the reverse drive gear.

In another embodiment according to any of the previous embodiments, the pump has an outer peripheral surface which is entirely intermediate the outer peripheral surfaces of the forward and reverse input gears.

In another embodiment according to any of the previous embodiments, an axis of rotation of the pump drive gear is intermediate axes of rotation of the reverse input gear and the forward input gear.

In another embodiment according to any of the previous embodiments, the pump has an outer peripheral surface which is entirely intermediate the outer peripheral surfaces of the forward and reverse input gears.

In another embodiment according to any of the previous embodiments, an axis of rotation of the pump drive gear is intermediate axes of rotation of the reverse input gear and the forward input gear.

In another embodiment according to any of the previous embodiments, an axis of rotation of the pump drive gear is intermediate axes of rotation of the reverse input gear and the forward input gear.

In another embodiment according to any of the previous embodiments, the auxiliary oil system being operable to allow the engine to operate under windmill conditions in the air for 90 minutes or longer.

In another embodiment according to any of the previous embodiments, the auxiliary oil system being operable to operate indefinitely on the ground when windmilling with wind speeds below 85 mph or less.

In another embodiment according to any of the previous embodiments, the auxiliary oil system being operable to fly with the engine in an aircraft under negative gravity conditions for at least 20 seconds.

In another embodiment according to any of the previous embodiments, the auxiliary oil system being operable to fly with the engine in an aircraft under negative gravity conditions for at least 20 seconds.

In another embodiment according to any of the previous embodiments, the auxiliary oil system being operable to operate indefinitely on the ground when windmilling with wind speeds below 85 mph or less.

In another embodiment according to any of the previous embodiments, the auxiliary oil system being operable to operate indefinitely on the ground when windmilling with wind speeds below 85 mph or less.

In another embodiment according to any of the previous embodiments, the auxiliary oil system being operable to fly with the engine in an aircraft under negative gravity conditions for at least 20 seconds.

These and other features may be best understood from the following drawings and specification.

DETAILED DESCRIPTION

Figure 1:
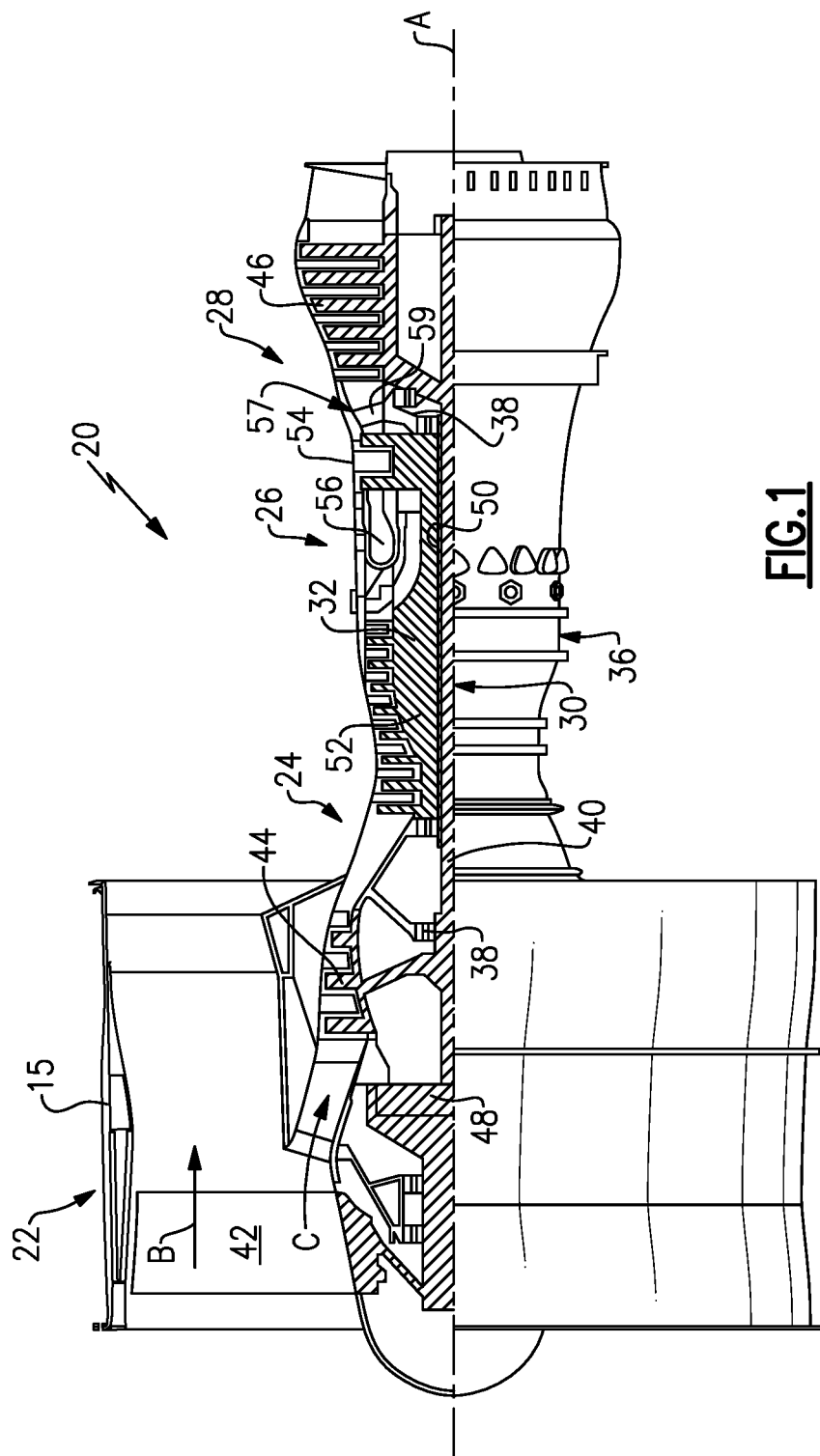
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
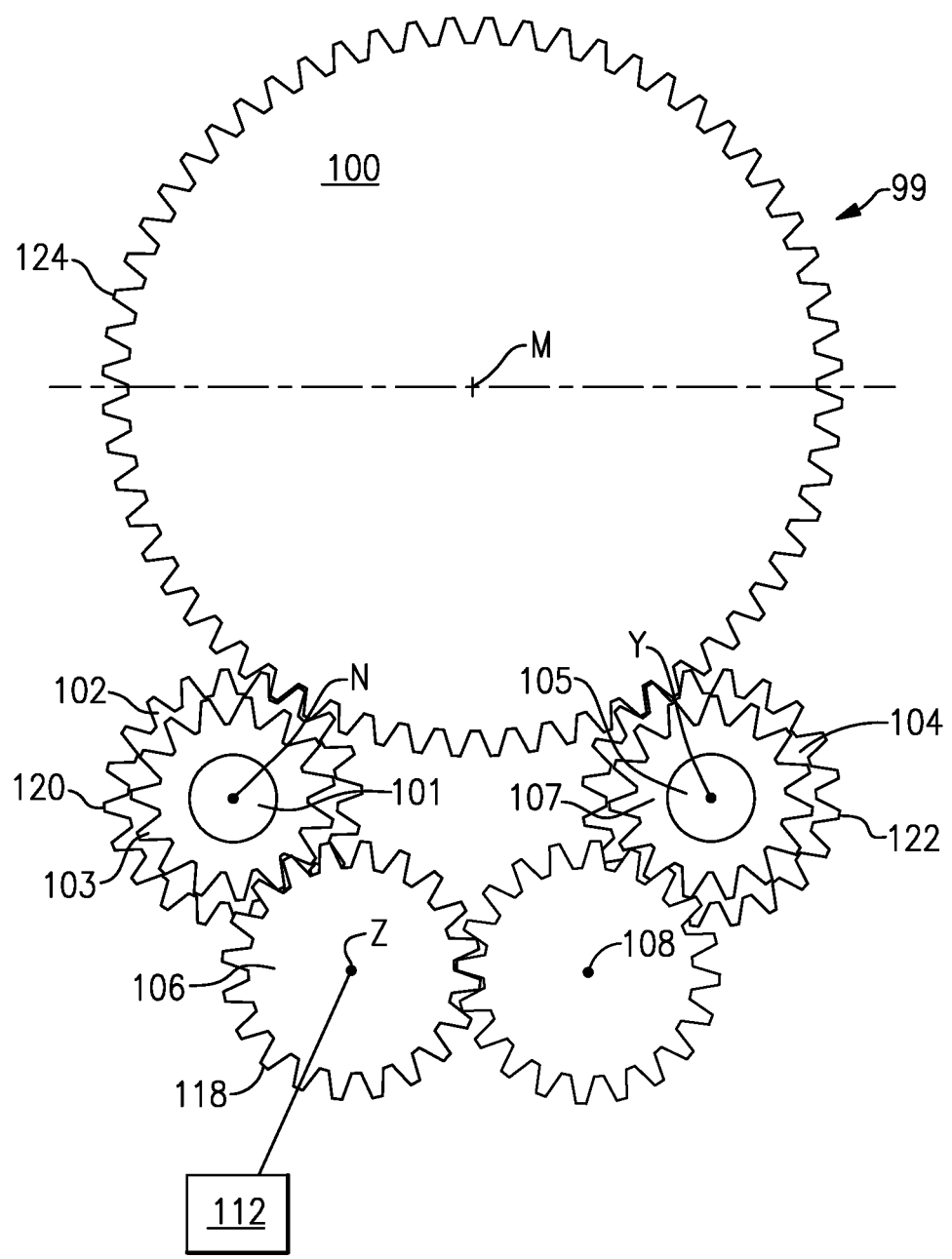
FIG. 2 shows a gear train.

FIG. 2 shows a gear train 99 for driving an oil pump 112. It should be understood the oil pump could be a main lubricant pump for a main lubricant system, or could be an auxiliary pump for an auxiliary system.

Some details of the overall lubricant system such as disclosed in published United States Patent Application No. US2017/0002738 may be utilized. As explained in that application, it is desirable for a lubricant system to provide lubricant to a gear reduction, such as gear reduction 48 in FIG. 1, under certain adverse conditions.

As one example, if there is a break or interruption in a main oil supply system, it would be desirable for the engine to be able to maintain operation for at least 30 seconds or longer at high power operation (such as takeoff) without damage to the gear reduction. This will provide time for a pilot to shut the engine down safely. Such an interruption could be caused by a break in an oil line, pump failure, or other failure in the main lubrication system.

After such an event, it is desirable to allow the engine to windmill in the air for 90 minutes or longer without damage to the gear reduction. It is also desirable to have the same protection if the engine is shut down for other reasons beyond oil system failure. As an example, a control system failure could shut the engine down and require it to windmill for extended periods of time.

It is also desirable to allow the engine to windmill indefinitely on the ground with wind speeds above 10 m.p.h. and below about 85 m.p.h. Ground windmilling refers to a condition where the engine is shut down. Wind may force the fan to rotate and turn causing components, such as components in the gear reduction to rotate. Such wind can turn the fan in a normal forward direction and also can turn the fan in a reverse direction should the wind flow from the back of the engine.

Finally, it is desirable to allow an aircraft to fly under negative gravity conditions for at least 20 seconds. During negative gravity conditions, the main oil system is interrupted similar to the first mentioned condition, but when positive gravity is returned, the main oil system may recover to full operation. To this end, the schematic pump of this disclosure may be arranged as a lubricant system as disclosed in U.S. Published Patent Application No. US 2017/0002738, the disclosure of which is incorporated by reference.

The previously cited published patent application provides an overall main and auxiliary oil supply system which can meet all of these goals. The features of the application relating to achieving these goals are hereby incorporated by reference.

This application is related to a gear train for efficiently packaging a drive that can ensure the oil pump will supply oil when experiencing windmilling in either forward or reverse rotation.

FIG. 2 shows a gear train 99 which will drive lubricant pump 112, when an associated fan rotor is windmilling in either direction. A gear 100 is fixed to rotate with the fan rotor. It may actually be driven by a portion of the gear reduction, by the fan shaft itself, or by some other component which rotates with the fan shaft, such as the low speed spool as disclosed with regard to FIG. 1.

Gear 100 is engaged to drive a forward input gear 102 and a reverse input gear 104. Gear 102 drives a pinion gear 103 through a clutch 101. These gears rotate about an axis of rotation N. The reverse input drive gear 104 drives a reverse pinion gear 107 through a clutch 105. These gears rotate about an axis of rotation Y.

The forward pinion gear 103 drives a pump drive gear 106 about an axis of rotation Z. The reverse pinion gear 107 drives a reverse idler 108 which is, in turn, engaged to the pump drive gear 106.

As can be appreciated from this figure, the main input drive gear 100 has an outer peripheral extent 124. The pump drive gear 106 has an outer peripheral surface 118. The outer peripheral surface of gear 106 is within the envelope of the outer peripheral surface 124 as defined in a plane perpendicular to the axis of rotation M. Similarly, the axis of rotation Z is intermediate the axes of rotation N and Y. Further, the outer peripheral surface 118 is entirely intermediate the outer peripheral surface 120 of the forward drive gear 102 and the outer peripheral surface 122 of the reverse drive gear 104. This is again defined in the plane mentioned above perpendicular to the axis of rotation M.

With this arrangement, the pump can be packaged in a more compact space than has been the case in the prior art.

Figure 3:
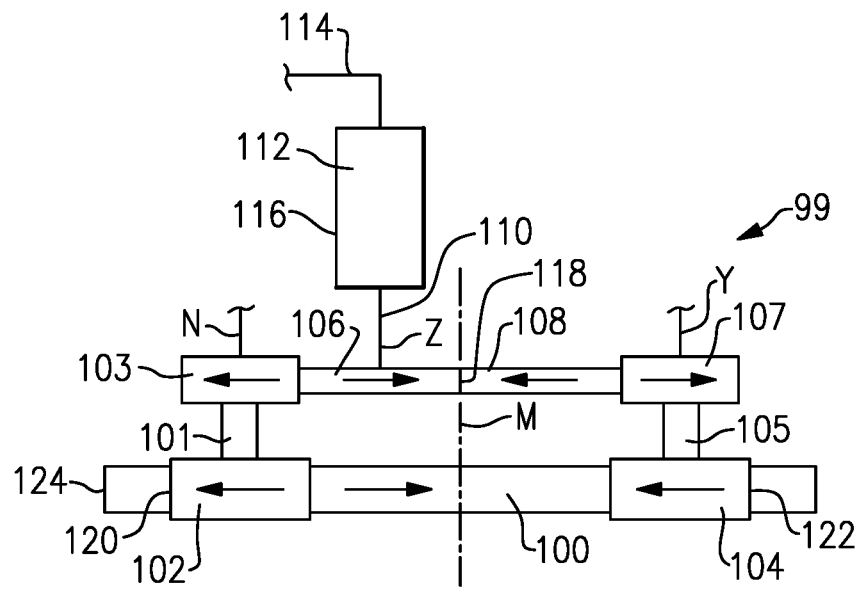
FIG. 3 shows rotation in a first direction.

FIG. 3 shows details of the gear train 99 when the fan is being driven in its forward or normal flight direction of rotation. With such rotation, clutch 105 will slip such that the input gear 104 does not drive the reverse pinion gear 107.

At the same time, the clutch 101 drives the forward pinion gear 103 which, in turn, drives the pump gear 106. An associated shaft 110 drives the pump 112. The pump 112 has an outer peripheral surface 116 which is entirely intermediate the outer peripheral surfaces 120 and 122 of the forward and reverse input gears 102 and 104.

The pump 112 is shown connected to a line 114 which will supply oil to the gear reduction.

Figure 4:
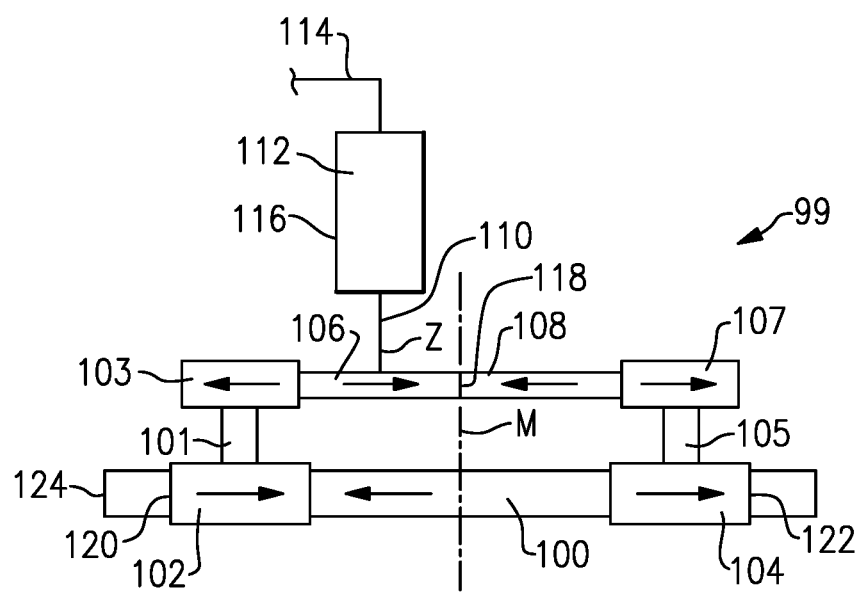
FIG. 4 shows rotation in a reverse direction of the gear connection.

FIG. 4 shows the gear train when the fan is driven in its reverse direction. At this point, the clutch 101 will slip and the clutch 105 will drive.

Figure 5A:
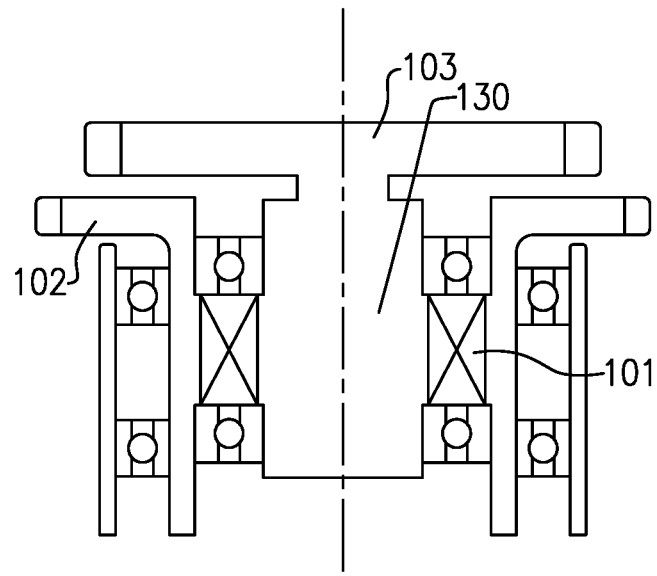
FIG. 5A shows a drive connection.

FIG. 5A shows details of the forward drive gear 102, the forward pinion 103, and the clutch 101. As shown, a shaft 130 of the forward pinion gear 103 is within the clutch 101, and the forward input gear 102 is radially outward of the clutch 101.

Figure 5B:
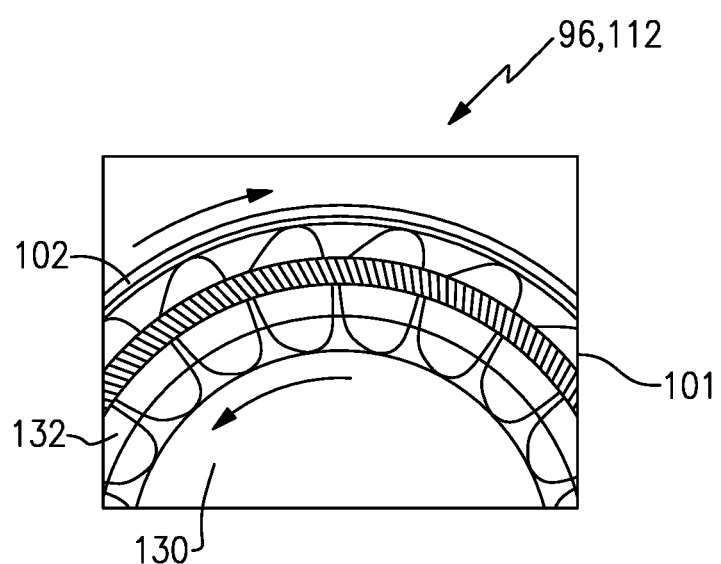
FIG. 5B shows a clutch detail

As shown in FIG. 5B, sprag clutch members 132 will transmit rotation from the gear 102 to the shaft 130 when driven in the forward direction. However, as known, when rotation occurs in the reverse direction, such rotation will not be transmitted by the members 132. While a sprag clutch is shown, other mechanical clutches that transmit rotation in one direction, but prohibits the transfer of torque in the opposed direction. As other examples, ramp roller clutches and spring clutches may be used.

The clutch 105 will operate in the same manner, however, only transmitting rotation in the reverse direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gas turbine engine comprising:
a fan driven by a fan drive turbine through a gear reduction;
an oil system including an oil pump driven by a main input gear, and said main input drive gear rotating when said fan rotor rotates;
a gear train intermediate said main input gear and said oil pump, said gear train including a forward input gear and a reverse input gear, each driven by said main input gear, said forward input gear driving a forward pinion gear through a first clutch and said reverse input gear driving a reverse pinion gear through a reverse clutch;
said forward clutch transmitting rotation from said forward input gear to said forward pinion gear when the fan is rotating in a first direction, and not transmitting rotation from said forward input gear to said forward pinion gear when the fan is rotating in a second opposed direction;
said reverse clutch transmitting rotation from said reverse input gear to said reverse pinion gear when the fan is rotating in the second opposed direction, and not transmitting rotation from said reverse input gear to said reverse pinion gear when the fan is rotating in the first direction;
one of said forward and reverse pinion gears driving a pump drive gear, to, in turn, drive said pump;

one of said reverse pinion gear and said forward pinion gear driving said pump drive gear through an idler gear; and wherein the outer peripheral surface of said pump drive gear is entirely intermediate an outer peripheral surface of the forward input gear and an outer peripheral surface of the reverse input gear.

2. The gas turbine engine as set forth in claim 1, wherein said reverse pinion gear is driving said pump drive gear through said idler gear.

3. The gas turbine engine as set forth in claim 1, wherein said first and second clutches are sprag clutches.

4. The gas turbine engine as set forth in claim 1, wherein an outer peripheral surface of said pump drive gear is within an envelope of an outer peripheral surface of said main input gear as defined in a plane perpendicular to an axis of rotation of said main input gear.

5. The gas turbine engine as set forth in claim 4, wherein the pump has an outer peripheral surface which is entirely intermediate the outer peripheral surfaces of the forward and reverse input gears.

6. The gas turbine engine as set forth in claim 5, wherein an axis of rotation of said pump drive gear is intermediate axes of rotation of said reverse input gear and said forward input gear.

7. The gas turbine engine as set forth in claim 1, wherein the pump has an outer peripheral surface which is entirely intermediate the outer peripheral surfaces of the forward and reverse input gears.

8. The gas turbine engine as set forth in claim 7, wherein an axis of rotation of said pump drive gear is intermediate axes of rotation of said reverse input gear and said forward input gear.

9. The gas turbine engine as set forth in claim 1, wherein the pump has an outer peripheral surface which is entirely intermediate the outer peripheral surfaces of the forward and reverse input gears.

10. The gas turbine engine as set forth in claim 9, wherein an axis of rotation of said pump drive gear is intermediate axes of rotation of said reverse input gear and said forward input gear.

11. The gas turbine engine as set forth in claim 1, wherein an axis of rotation of said pump drive gear is intermediate axes of rotation of said reverse input gear and said forward input gear.

12. A gas turbine engine comprising:
a fan driven by a fan drive turbine through a gear reduction;
an oil system including an oil pump driven by a main input gear, and said main input drive gear rotating when said fan rotor rotates;
a gear train intermediate said main input gear and said oil pump, said gear train including a forward input gear and a reverse input gear, each driven by said main input gear, said forward input gear driving a forward pinion gear through a first clutch and said reverse input gear driving a reverse pinion gear through a reverse clutch;
said forward clutch transmitting rotation from said forward input gear to said forward pinion gear when the fan is rotating in a first direction, and not transmitting rotation from said forward input gear to said forward pinion gear when the fan is rotating in a second opposed direction;
said reverse clutch transmitting rotation from said reverse input gear to said reverse pinion gear when the fan is rotating in the second opposed direction, and not transmitting rotation from said reverse input gear to said reverse pinion gear when the fan is rotating in the first direction;
one of said forward and reverse pinion gears driving a pump drive gear, to, in turn, drive said pump;
one of said reverse pinion gear and said forward pinion gear driving said pump drive gear through an idler gear; and
wherein the pump has an outer peripheral surface which is entirely intermediate the outer peripheral surfaces of the forward and reverse input gears.

13. The gas turbine engine as set forth in claim 12, wherein an axis of rotation of said pump drive gear is intermediate axes of rotation of said reverse input gear and said forward input gear.

14. A gas turbine engine comprising:
a fan driven by a fan drive turbine through a gear reduction;
an oil system including an oil pump driven by a main input gear, and said main input drive gear rotating when said fan rotor rotates;
a gear train intermediate said main input gear and said oil pump, said gear train including a forward input gear and a reverse input gear, each driven by said main input gear, said forward input gear driving a forward pinion gear through a first clutch and said reverse input gear driving a reverse pinion gear through a reverse clutch;
said forward clutch transmitting rotation from said forward input gear to said forward pinion gear when the fan is rotating in a first direction, and not transmitting rotation from said forward input gear to said forward pinion gear when the fan is rotating in a second opposed direction;
said reverse clutch transmitting rotation from said reverse input gear to said reverse pinion gear when the fan is rotating in the second opposed direction, and not transmitting rotation from said reverse input gear to said reverse pinion gear when the fan is rotating in the first direction;
one of said forward and reverse pinion gears driving a pump drive gear, to, in turn, drive said pump;
one of said reverse pinion gear and said forward pinion gear driving said pump drive gear through an idler gear; and
wherein an axis of rotation of said pump drive gear is intermediate axes of rotation of said reverse input gear and said forward input gear.

* * * * *